No. 617,801. Patented Jan. 17, 1899.
J. E. BERKSTRESSER.
SYRUP PITCHER.
(Application filed Aug. 10, 1898.)
(No Model.)

WITNESSES
K. E. Langtry.
F. A. Stewart

INVENTOR
John E. Berkstresser.
BY
Edgar Sale & Co.
ATTORNEYS

THE NORRIS PETERS CO., PHOTO-LITHO., WASHINGTON, D. C.

UNITED STATES PATENT OFFICE.

JOHN EMORY BERKSTRESSER, OF SYLACAUGA, ALABAMA.

SYRUP-PITCHER.

SPECIFICATION forming part of Letters Patent No. 617,801, dated January 17, 1899.

Application filed August 10, 1898. Serial No. 688,235. (No model.)

*To all whom it may concern:*

Be it known that I, JOHN EMORY BERKSTRESSER, a citizen of the United States, residing at Sylacauga, in the county of Talladega and State of Alabama, have invented certain new and useful Improvements in Syrup-Pitchers, of which the following is a full and complete specification, such as will enable those skilled in the art to which it appertains to make and use the same.

This invention relates to syrup-pitchers and similar vessels; and the object thereof is to provide a vessel of this class with a hinged and spring-supported drip-cup, which is designed to receive the drippings from the spout: and with this and other objects in view the invention consists in the construction, combination, and arrangement of parts hereinafter described and claimed.

The invention is fully disclosed in the following specification, of which the accompanying drawings form a part, in which—

Figure 1:
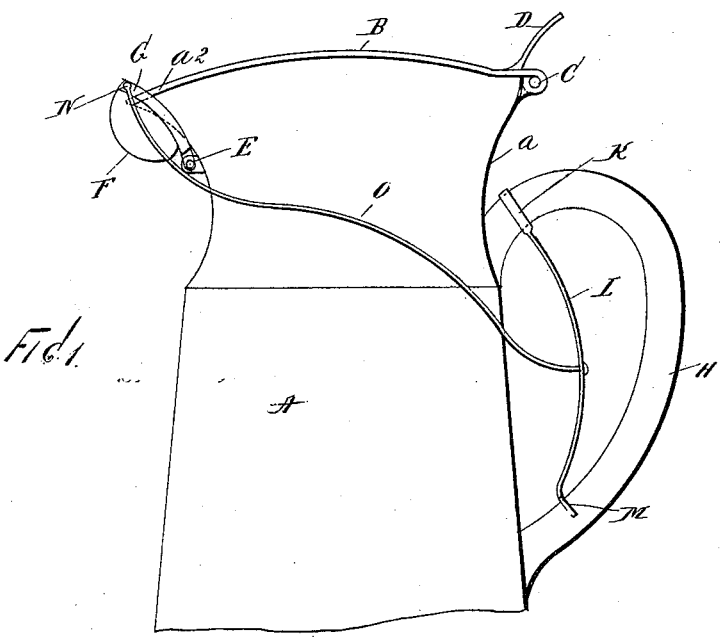
Figure 2:
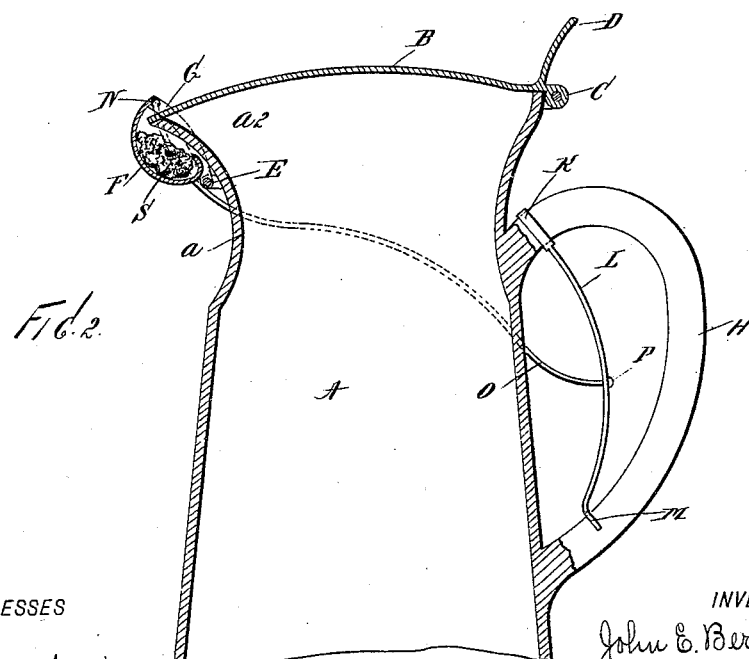

Figure 1 is a side view of a pitcher provided with my improvement, and Fig. 2 a central vertical section thereof.

In the drawings forming part of this specification the separate parts of my improvement are designated by the same letters of reference in each of the views, and in said drawings I have shown at A an ordinary pitcher which is provided with a neck *a* and a discharge-spout $a^2$. The pitcher A is also provided with a cover B, which is hinged thereto opposite the discharge-spout, as shown at C, and said cover is provided adjacent to the hinge with an upwardly and backwardly directed projection D, by which the free edge thereof may be raised in the usual manner.

Hinged to the pitcher A directly under the discharge-spout, as shown at E, is a drip-cup F, which is preferably provided with a metal rim G, and in practice I connect with the upper part of the handle H of the pitcher, adjacent to the side thereof, a clamp K, with which is connected a spring-arm L, the lower end of which is forked or bifurcated and straddles the lower portion of the handle H, as shown at M.

Pivotally connected with the upper portion of the drip-cup F at M is a double-spring attachment O, which straddles the pitcher and which is also connected with the spring-arm L at P, and in practice I preferably place in the drip-cup F a sponge S, which is designed to receive the drip from the discharge-spout of the pitcher, and said sponge may be removed and cleaned whenever desired.

The operation will be readily understood from the foregoing description when taken in connection with accompanying drawings and the following statement thereof.

Whenever it is desired to discharge the contents of the pitcher or a portion thereof, the handle H is grasped in the usual manner and one finger of the hand is placed around the spring-arm L, which is drawn outwardly. This operation draws down the drip-cup, and the contents of the pitcher may be discharged in the usual manner. When the spring-arm L is released, the drip-cup is automatically thrown back by said spring-arm into the position shown in the drawings, and any and all drip from the discharge-spout of the pitcher will fall therein.

The sponge S is not absolutely essential and may or may not be employed, as the drip-cup may be so made as to receive the drip and hold it therein until such time as it is desired to clean said cup.

My improvement is simple in construction and operation and perfectly adapted to accomplish the result for which it is intended, and it will be apparent that changes in and modifications of the construction herein described may be made without departing from the spirit of my invention or sacrificing its advantages.

Having fully described my invention, I claim as new and desire to secure by Letters Patent—

1. A pitcher, provided with a handle and a discharge-spout, a drip-cup hinged to the pitcher beneath the discharge-spout and normally held in position to receive the drip, a spring-arm connected with the handle and an operative device connected with the drip and with said spring-arm, substantially as shown and described.

2. A pitcher provided with a handle and a discharge-spout, a drip-cup hinged to the pitcher directly beneath the discharge-spout, and adapted to be held in a raised position, a spring-arm secured to the upper portion of the handle and projecting downwardly, and a rod or similar device hinged to said drip-cup and connected with said spring-arm and adapted to hold the drip-cup in a raised position, substantially as shown and described.

3. A pitcher provided with a handle and a discharge-spout, a drip-cup hinged to the pitcher directly beneath the discharge-spout, and adapted to be held in a raised position, a spring-arm secured to the upper portion of the handle and projecting downwardly, and a rod or similar device hinged to said drip-cup and connected with said spring-arm and adapted to hold the drip-cup in a raised position, said pitcher being also provided with a hinged cover, substantially as shown and described.

4. A pitcher provided with the usual handle and discharge-spout, said parts being on opposite sides, a drip-cup hinged to said pitcher beneath the discharge-spout, and adapted to receive the drip, and devices connected with the handle of the pitcher and with said cup for holding said cup normally in a raised position, and for lowering the same when desired, substantially as shown and described.

In testimony that I claim the foregoing as my invention I have signed my name, in presence of the subscribing witnesses, this 6th day of August, 1898.

JOHN EMORY BERKSTRESSER.

Witnesses:
BURGESS LITTLE,
EDGAR PERRY ALLEN.